United States Patent
Yu et al.

(10) Patent No.: US 9,806,971 B2
(45) Date of Patent: Oct. 31, 2017

(54) RESTRICTED-SIGNAL CONFIRMATION FOR HIGH-THROUGHPUT LINKS

(71) Applicant: EVA Automation, Inc., Redwood City, CA (US)

(72) Inventors: Gaylord Yu, San Francisco, CA (US); Omar Zakaria, Santa Clara, CA (US)

(73) Assignee: EVA Automation, Inc., Redwood City, CA (US)

( * ) Notice: Subject to any disclaimer, the term of this patent is extended or adjusted under 35 U.S.C. 154(b) by 211 days.

(21) Appl. No.: 14/945,424

(22) Filed: Nov. 19, 2015

(65) Prior Publication Data

US 2017/0149636 A1    May 25, 2017

(51) Int. Cl.
*H04L 12/26*    (2006.01)
*H04W 24/02*    (2009.01)

(52) U.S. Cl.
CPC ............ *H04L 43/08* (2013.01); *H04W 24/02* (2013.01)

(58) Field of Classification Search
CPC ........ H04L 43/08; H04W 24/02; H04W 92/16
See application file for complete search history.

(56) References Cited

U.S. PATENT DOCUMENTS

| | | | | |
|---|---|---|---|---|
| 6,870,815 B2* | 3/2005 | McFarland | ............... | H04L 1/22 370/250 |
| 9,250,314 B2* | 2/2016 | Rezk | ....................... | G01S 7/021 |
| 9,521,556 B2* | 12/2016 | Jin | ........................ | H04W 16/14 |
| 9,609,568 B1* | 3/2017 | Karimli | .................. | H04L 43/16 |
| 2003/0107512 A1* | 6/2003 | McFarland | ............ | G01S 7/021 342/159 |
| 2004/0146022 A1* | 7/2004 | Lewis | ..................... | G01S 7/021 370/331 |
| 2009/0323652 A1* | 12/2009 | Chen | ...................... | H04B 1/406 370/338 |
| 2012/0207040 A1* | 8/2012 | Comsa | ............. | H04W 72/1215 370/252 |
| 2013/0052964 A1* | 2/2013 | Husted | .................. | H04B 17/11 455/73 |
| 2014/0219142 A1* | 8/2014 | Schulz | ..................... | H04L 5/14 370/280 |
| 2014/0220964 A1* | 8/2014 | Kurucz, Jr. | .......... | H04W 72/08 455/423 |
| 2014/0355532 A1* | 12/2014 | Shapira | ................ | H04W 72/08 370/329 |

(Continued)

*Primary Examiner* — Tejis Daya
(74) *Attorney, Agent, or Firm* — Steven Stupp

(57) ABSTRACT

In order to maintain performance during wireless communication via a channel in a restricted band of frequencies, a transmitting electronic device may monitor for unknown wireless signals in the restricted band of frequencies. If unknown wireless signals are detected by a radio in the transmitting electronic device, the transmitting electronic device may transfer the communication to another channel (which may have poorer performance) in a band of frequencies outside of the restricted band of frequencies. Moreover, a separate radio in the transmitting electronic device may concurrently receive the unknown wireless signals in the channel and may analyze the unknown wireless signals based on a target signature. If the unknown wireless signals do not match the target signature, the transmitting electronic device may transfer the communication back to the channel to restore the performance.

21 Claims, 5 Drawing Sheets

(56) References Cited

U.S. PATENT DOCUMENTS

| | | | | |
|---|---|---|---|---|
| 2015/0009962 A1* | 1/2015 | Clegg | H04L 5/0062 | |
| | | | 370/331 | |
| 2015/0296413 A1* | 10/2015 | Sadek | H04B 1/1027 | |
| | | | 375/348 | |
| 2015/0296508 A1* | 10/2015 | Fan | H04W 72/0446 | |
| | | | 370/329 | |
| 2016/0037544 A1* | 2/2016 | Wang | H04W 88/06 | |
| | | | 370/329 | |
| 2016/0165617 A1* | 6/2016 | Sakamoto | H04W 16/14 | |
| | | | 370/329 | |
| 2016/0183220 A1* | 6/2016 | Rashid | H04W 72/042 | |
| | | | 370/329 | |
| 2016/0192214 A1* | 6/2016 | Yu | H04W 76/025 | |
| | | | 370/228 | |
| 2016/0373979 A1* | 12/2016 | Dai | H04W 36/06 | |
| 2017/0034707 A1* | 2/2017 | Green | H04W 16/10 | |
| 2017/0034755 A1* | 2/2017 | Casebolt | H04W 36/06 | |
| 2017/0094651 A1* | 3/2017 | Green | H04W 72/048 | |

\* cited by examiner

RESTRICTED-SIGNAL CONFIRMATION FOR HIGH-THROUGHPUT LINKS

BACKGROUND

Field

The described embodiments relate to techniques for communicating information in a wireless network, including maintaining throughput in a link by determining if detection of a possible restricted signal is correct or a false positive.

Related Art

Wireless communication is an increasingly popular technology for communicating information between electronic devices. In particular, these electronic devices may include networking subsystem that implement a network interface for a wireless local area network such as: a wireless network described in the Institute of Electrical and Electronics Engineers (IEEE) 802.11 standard, Bluetooth® (from the Bluetooth Special Interest Group of Kirkland, Wash.), and/or another type of wireless network.

However, the performance during wireless communication among electronic devices can vary significantly over time. For example, many wireless networks are allowed to use restricted bands of frequencies that, in principle, are dual use. In the alternate restricted use case, the restricted bands of frequencies can be used by the government for military purposes or for weather forecasting. Consequently, electronic devices that use restricted bands of frequencies are typically required to scan for signals associated with the alternate restricted use case, such as radar signals. If an electronic device detects such signals, the electronic device is usually required to quickly cease using the restricted band of frequencies.

In practice, if an electronic device detects unknown wireless signals in a restricted band of frequencies, the electronic device often does not have sufficient time to confirm that the unknown wireless signals are associated with the alternate restricted use case. Moreover, when the electronic device ceases using the restricted band of frequencies, the electronic device may transfer communication to a more crowded band of frequencies. Communication in the crowded band of frequencies is often slower, which degrades the user experience.

SUMMARY

The described embodiments include a transmitting electronic device. This transmitting electronic device includes: a first antenna; a second antenna; a first interface circuit coupled to the first antenna; and a second interface circuit coupled to the second antenna. During operation, the first interface circuit may receive first wireless signals in a first channel in a restricted band of frequencies, and may analyze the first wireless signals based on a target signature. Moreover, the second interface circuit may communicate packets with a receiving electronic device via the first channel. When the second interface circuit detects second wireless signals, which are other than those associated with the communication, in the first channel, the second interface circuit may transfer the communication with the receiving electronic device to a second channel in a band of frequencies outside of the restricted band of frequencies. Furthermore, when the analysis by the first interface circuit indicates the first wireless signals have a signature other than the target signature, the second interface circuit may transfer the communication with the receiving electronic device back to the first channel.

Note that the restricted band of frequencies may include an Unlicensed-National Information Infrastructure (U-NII) band of frequencies subject to Dynamic Frequency Selection (DFS) and the band of frequencies outside of the restricted band of frequencies may include a U-NII band of frequencies without DFS. Moreover, the target signature may correspond to radar signals. However, the transmitting electronic device may apply this communication technique in other bands of frequencies and with a target signature associated with signals other than radar signals.

Furthermore, the analysis may include spectral analysis. Additionally, the communication of the packets may be compatible with an IEEE 802.11 standard.

In some embodiments, the second interface circuit activates the first interface circuit after transferring the communication to the second channel.

Moreover, when the analysis by the first interface circuit indicates the first wireless signals have the signature other than the target signature, the second interface circuit may transfer the communication back to the first channel in less than a second after transferring the communication to the second channel.

Note that transferring the communication back to the first channel may maintain a performance metric (such as throughput) associated with the communication.

Another embodiment of the transmitting electronic device includes: the second antenna, the second interface circuit, and an input/output (I/O) interface. This I/O interface may communicate with a wireless receiver (which includes the first antenna and the first interface circuit) that receives the first wireless signals in the first channel in the restricted band of frequencies, and analyzes the first wireless signals based on the target signature. For example, the wireless receiver may be implemented on a circuit board in the transmitting electronic device. Alternatively, the wireless receiver may be plugged into the transmitting electronic device. Thus, the wireless receiver may be included in the transmitting electronic device.

In some embodiments of the transmitting electronic device, the first antenna and the first interface circuit are not included. Instead, the second interface circuit communicates with a transceiver that is separate from the transmitting electronic device. This transceiver monitors the channel and alerts the transmitting electronic device in the event that detected wireless signals in the channel are a false positive (i.e., do not match the target signature). Thus, the transmitting electronic device may wirelessly receive the analysis of the first wireless signals from the transceiver.

Another embodiment provides a computer-program product for use with the transmitting electronic device. This computer-program product includes instructions for at least some of the operations performed by the transmitting electronic device.

Another embodiment provides a method for transferring communication between the first channel in the restricted band of frequencies and the second channel in the band of frequencies outside of the restricted band of frequencies. This method includes at least some of the operations performed by the transmitting electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects,

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to maintain performance during wireless communication via a channel in a restricted band of frequencies, a transmitting electronic device may monitor for unknown wireless signals in the restricted band of frequencies. If unknown wireless signals are detected by a radio in the transmitting electronic device, the transmitting electronic device may transfer the communication to another channel (which may have poorer performance) in a band of frequencies outside of the restricted band of frequencies. Moreover, a separate radio in the transmitting electronic device may concurrently receive the unknown wireless signals in the channel and may analyze the unknown wireless signals based on a target signature. If the unknown wireless signals do not match the target signature, the transmitting electronic device may transfer the communication back to the channel to restore the performance.

In this way, the transmitting electronic device may avoid degrading performance because of false-positive detections of wireless signals thought to have the target signature in the restricted band of frequencies. Consequently, the transmitting electronic device may improve the user experience when using the transmitting electronic device and/or the receiving electronic device.

In the discussion that follows the transmitting and the receiving electronic devices include radios that communicate packets in accordance with a wireless-local-area-network (WLAN) communication protocol, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), and/or another type of wireless interface. In the discussion that follows, Wi-Fi is used as an illustrative example. However, a wide variety of communication protocols may be used.

Figure 1:
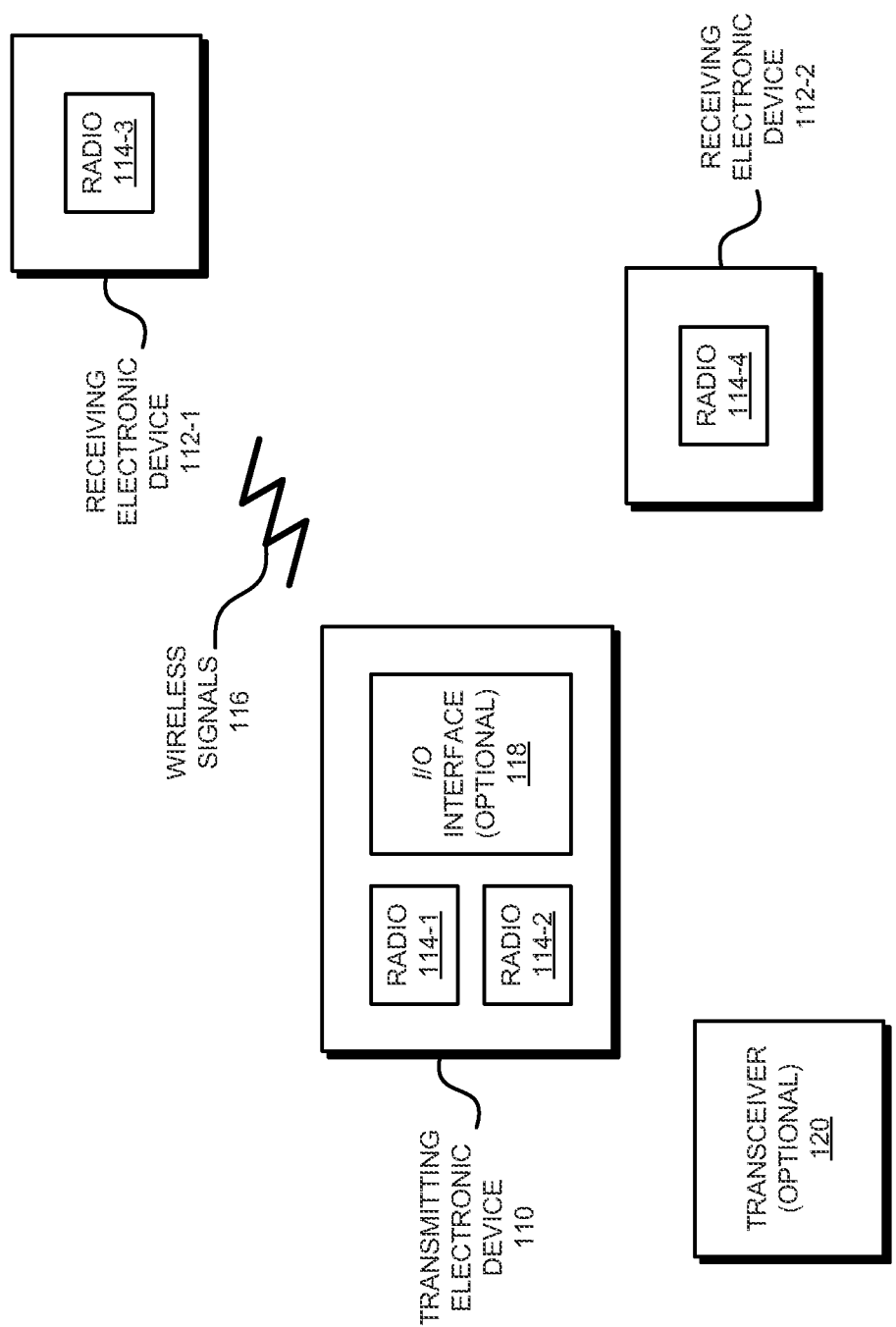
FIG. 1 is a block diagram illustrating electronic devices wirelessly communicating in accordance with an embodiment of the present disclosure.

Communication among electronic devices is shown in FIG. 1, which presents a block diagram illustrating transmitting electronic device 110 (such as an access point, which provides a connection to a wired network, e.g., the Internet) and one or more receiving electronic devices 112 (such as portable electronic devices, e.g., cellular telephones) wirelessly communicating according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 5:
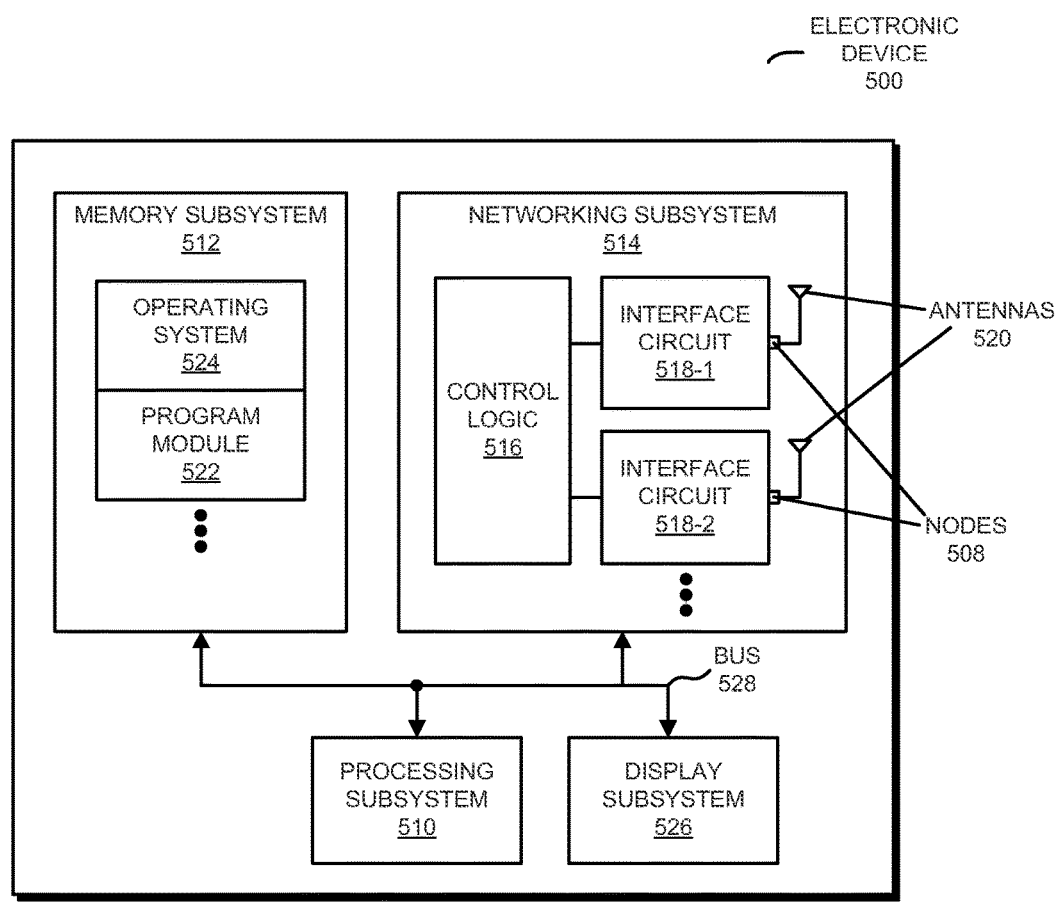
FIG. 5 is a block diagram illustrating one of the electronic devices of FIG. 1 in accordance with an embodiment of the present disclosure.

As described further below with reference to FIG. 5, transmitting electronic device 110 and the one or more receiving electronic devices 112 may include subsystems, such as: a networking subsystem, a memory subsystem and a processor subsystem. In addition, transmitting electronic device 110 and the one or more receiving electronic devices 112 may include radios 114 in the networking subsystems. (Note that radios 114 may be instances of the same radio or may be different from each other.) More generally, transmitting electronic device 110 and the one or more receiving electronic devices 112 can include (or can be included within) any electronic devices with the networking subsystems that enable transmitting electronic device 110 and the one or more receiving electronic devices 112 to wirelessly communicate with each other. This wireless communication can comprise transmitting advertisements or beacons on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by a jagged line) are transmitted from a radio 114-1 in transmitting electronic device 110. These wireless signals 116 are received by at least one of the one or more receiving electronic devices 112 (such as receiving electronic device 112-1). In particular, transmitting electronic device 110 may transmit packets. In turn, these packets may be received by radio 114-3 in receiving electronic device 112-1. This may allow transmitting electronic device 110 to communicate information to receiving electronic device 112-1. While FIG. 1 illustrates transmitting electronic device 110 transmitting packets, note that transmitting electronic device 110 may also receive packets from the one or more receiving electronic devices 112.

In the described embodiments, processing of a packet or frame in transmitting electronic device 110 and/or the one or more receiving electronic devices 112 includes: receiving wireless signals 116 with the packet or frame; decoding/extracting the packet or frame from received wireless signals 116 to acquire the packet or frame; and processing the packet or frame to determine information contained in the packet or frame (such as the information included in the payload). For example, the information may include audio and video that are displayed on at least one of receiving electronic devices 112 or a display (such as a television) coupled to receiving electronic device 112-1. Note that the communication between transmitting electronic device 110 and a given one of receiving electronic devices 112 (such as receiving electronic device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

Transmitting electronic device 110 may communicate packets to receiving electronic device 112-1 using a channel (which is associated with a connection or link) in a restricted band of frequencies. For example, the restricted band of frequencies may include an Unlicensed-National Information Infrastructure (U-NII) band of frequencies subject to Dynamic Frequency Selection (DFS), such as any of channels 36, 40, 44 and 64-165 in the 5 GHz unlicensed band of frequencies in the United States and Europe. This restricted band of frequencies may also be used by the government. In particular, the other or restricted use case may include radar signals transmitted in the restricted band of frequencies by the military or a meteorological agency. Transmitting electronic device 110 may be required to monitor for such wireless signals in the restricted band of frequencies. When radio 114-1 detects wireless signals that may be associated with the other or restricted use case (e.g., wireless signals that are other than those used to communicate with receiving electronic device 112-1), radio 114-1 may rapidly (such as within a millisecond) transfer or hand off the communication with receiving electronic device 112-1 to another channel in a band of frequencies outside of the restricted band of frequencies (such as a U-NII band of frequencies without DFS, e.g., any of channels 183-34, 38, 42 and 46 in the 5 GHz unlicensed band of frequencies in the United States and Europe), thereby avoiding potential interference with the wireless signals associated with the other or restricted use case.

However, the band of frequencies outside of the restricted band of frequencies may be more crowded than the restricted band of frequencies, and thus the other channel may have poorer performance (such as a lower throughput) than the channel. This degraded performance can be frustrating to users of transmitting electronic device 110 and receiving electronic device 112-1, e.g., there may be increase the latency for the communication and the quality of video streamed to a television may degrade or there may be a pause in the video. Moreover, transmitting electronic device 110 may avoid using the channel for an extended time interval (such as at least a minute), even though the detected wireless signals may not have been the wireless signals associated with the other or restricted use case (e.g., there may not have been radar signals in the restricted band of frequencies, and the detection was a false positive).

Figure 2:
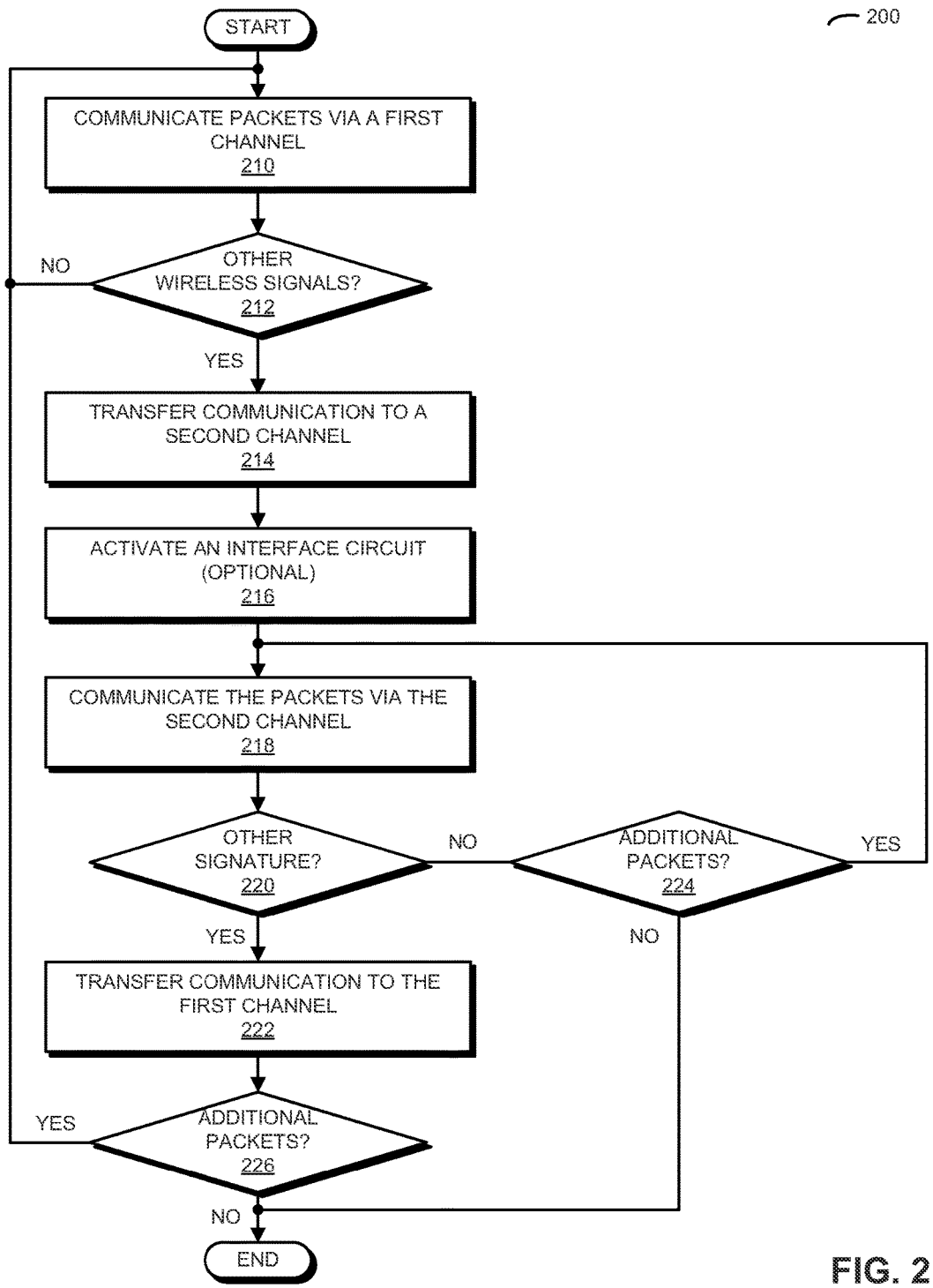
FIG. 2 is a flow diagram illustrating a method for transferring communication between a first channel in a restricted band of frequencies and a second channel in a band of frequencies outside of the restricted band of frequencies in accordance with an embodiment of the present disclosure.

As described further below with reference to FIGS. 2-4, in order to address this challenge transmitting electronic device 110 may include radio 114-2 (which may be a simplified radio, such as a wireless receiver). This radio may continue to monitor or receive the wireless signals in the channel after radio 114-1 has transferred to communication to the other channel. (In some embodiments, transmitting electronic device 110 may activate or wake up radio 114-2 after radio 114-1 has transferred to communication to the other channel, thereby allowing radio 114-2 to remain in a low power state at other times so that the power consumption of transmitting electronic device 110 can be reduced.)

Moreover, radio 114-2 may analyze the wireless signals based on a target signature of the wireless signals associated with the other or restricted use case to determine if the detection was a false positive. For example, in the case of possible radar signals, radio 114-2 may perform spectral analysis on the wireless signals to see if they match the bandwidth and spectral content (such as the power spectral density or energy) associated with radar signals, i.e., the target signature may correspond to radar signals. More generally, the analysis of the wireless signals received by radio 114-2 may be based on an arbitrary characteristic of the wireless signals associated with the other or the restricted use case, including time-domain and/or frequency domain characteristics of the wireless signals. (In some embodiments, note that the analysis of the wireless signals received by radio 114-2 is performed by another component in transmitting electronic device 110, such as by a processor.)

Furthermore, when the analysis by radio 114-2 indicates that the wireless signals in the channel have a signature other than the target signature, radio 114-1 may transfer the communication with receiving electronic device 112-1 back to the channel. As described further below, this may maintain a performance metric (such as throughput) associated with the communication, especially when the channel has better performance than the other channel. In the event of a false positive, note that the elapsed time between radio 114-1 transferring or transitioning the communication to the other channel and then back to the channel may be less than a second (e.g., the elapsed time may be 10 ms).

While the preceding discussion illustrated the use of the communication technique in a restricted band of frequencies subject to DFS, in other embodiments the communication technique is used with a band of frequencies that is not subject to DFS. For example, the channel may be in the band of frequencies that is not subject to DFS, when radio 114-1 detects interference (directly, e.g., based on a received signal strength indicator, and/or indirectly based on degradation of a performance metric associated with the communication). In response, radio 114-1 may transfer the communication to a different channel in the same or another band of frequencies. Radio 114-2 may continue to monitor the channel, and if the interference is no longer present may alert radio 114-1, which may then transfer of handoff the communication back to the channel. Thus, if radio 114-1 communicates packets in the channel in one of the industrial, scientific and medical (ISM) radio bands and transient interference (associated with a microwave oven, Bluetooth signals, a baby monitor, etc.) occurs, the communication technique may allow the channel to be used again as soon as the interference discontinues.

Although we describe the network environment shown in FIG. 1 as an example, in alternative embodiments, different numbers or types of electronic devices may be present. For example, some embodiments comprise more or fewer electronic devices. As another example, in another embodiment different electronic devices are transmitting and/or receiving packets or frames. In some embodiments, transmitting electronic device 110 includes an optional input/output (I/O) interface 118, such as: peripheral component interconnect express, a universal asynchronous receiver/transmitter, a serial port, a parallel port, a universal serial port, Ethernet, a secure digital card interface (such as secure digital input and output), a serial peripheral interface, general purpose input/output, and/or another type of interface. In these embodiments, radio 114-2 may be coupled to radio 114-1 via optional I/O interface 118 (e.g., radio 114-2 may be implemented on a circuit board in transmitting electronic device 110). Alternatively, transmitting electronic device 110 may not include radio 114-2. Instead, a separate radio or a wireless receiver may be (remateably or non-remateably) coupled to optional I/O interface 118, which allows this radio or wireless receiver to monitor the channel and to alert radio 114-1 in the event that detected wireless signals in the channel are a false positive (e.g., when they are not radar signals). For example, the wireless receiver may be plugged into transmitting electronic device 110, thereby expanding is functionality so it can perform the communication technique. Similarly, transmitting electronic device 110 may use radio 114-1 (or, if present, radio 114-2) to communicate with an optional transceiver 120 (such as a radio), which is separate from transmitting electronic device 110. This transceiver monitors the channel and alerts radio 114-1 in the event that detected wireless signals in the channel are a false positive. Thus, transmitting electronic device 110 may wirelessly receive the analysis of the wireless signals in the channel from optional transceiver 120.

We now further describe the communication technique. FIG. 2 presents embodiments of a flow diagram illustrating method 200 for transferring communication between a first channel in a restricted band of frequencies and a second channel in a band of frequencies outside of the restricted band of frequencies, which may be performed by a transmitting electronic device, such as transmitting electronic device 110 (FIG. 1). During operation, the transmitting electronic device communicates packets with a receiving electronic device via the first channel (operation 210). Then, when the transmitting electronic device detects wireless signals in the first channel (operation 212) that are other than those associated with the communication, the transmitting electronic device transfers the communication with the receiving electronic device to the second channel (operation 214) and communicates the packets with the receiving electronic device via the second channel (operation 218). Otherwise (operation 212), the transmitting electronic device continues communicating the packets (operation 210).

Next, when analysis of the wireless signals in the first channel indicates the wireless signals have a signature other than a target signature (operation 220), the transmitting electronic device transfers the communication with the receiving electronic device back to the first channel (operation 222). If there are still packets to be communicated (operation 226), the packets are communicated with the receiving electronic device via the first channel (operation 210). Otherwise (operation 226), method 200 ends.

Alternatively, if the wireless signals have the target signature (operation 220), and there are still packets to be communicated (operation 224), the transmitting electronic device continues communicating the packets in the second channel (operation 218). Otherwise (operation 224), method 200 ends.

In some embodiments, after transferring the communication with the receiving electronic device to the second channel (operation 214), the transmitting electronic device optionally activates an interface circuit (operation 216) that receives the wireless signals in the first channel and that performs the analysis.

In these ways, the transmitting electronic device (for example, an interface circuit, a driver and/or software executed in an environment of the transmitting electronic device) may facilitate communication with the receiving electronic device. In particular, the transmitting electronic device may determine when the wireless signals in the first channel are false positives, and may continue using the first channel so that performance (such as throughput) during the communication with the receiving electronic device can be maintained. This may reduce latency and/or disruptions in service (such as the displaying of video on the receiving electronic device) and, thus, may improve the user experience when communicating via the transmitting electronic device.

In some embodiments of method 200 (FIG. 2), there may be additional or fewer operations. Moreover, the order of the operations may be changed, and/or two or more operations may be combined into a single operation.

Figure 3:
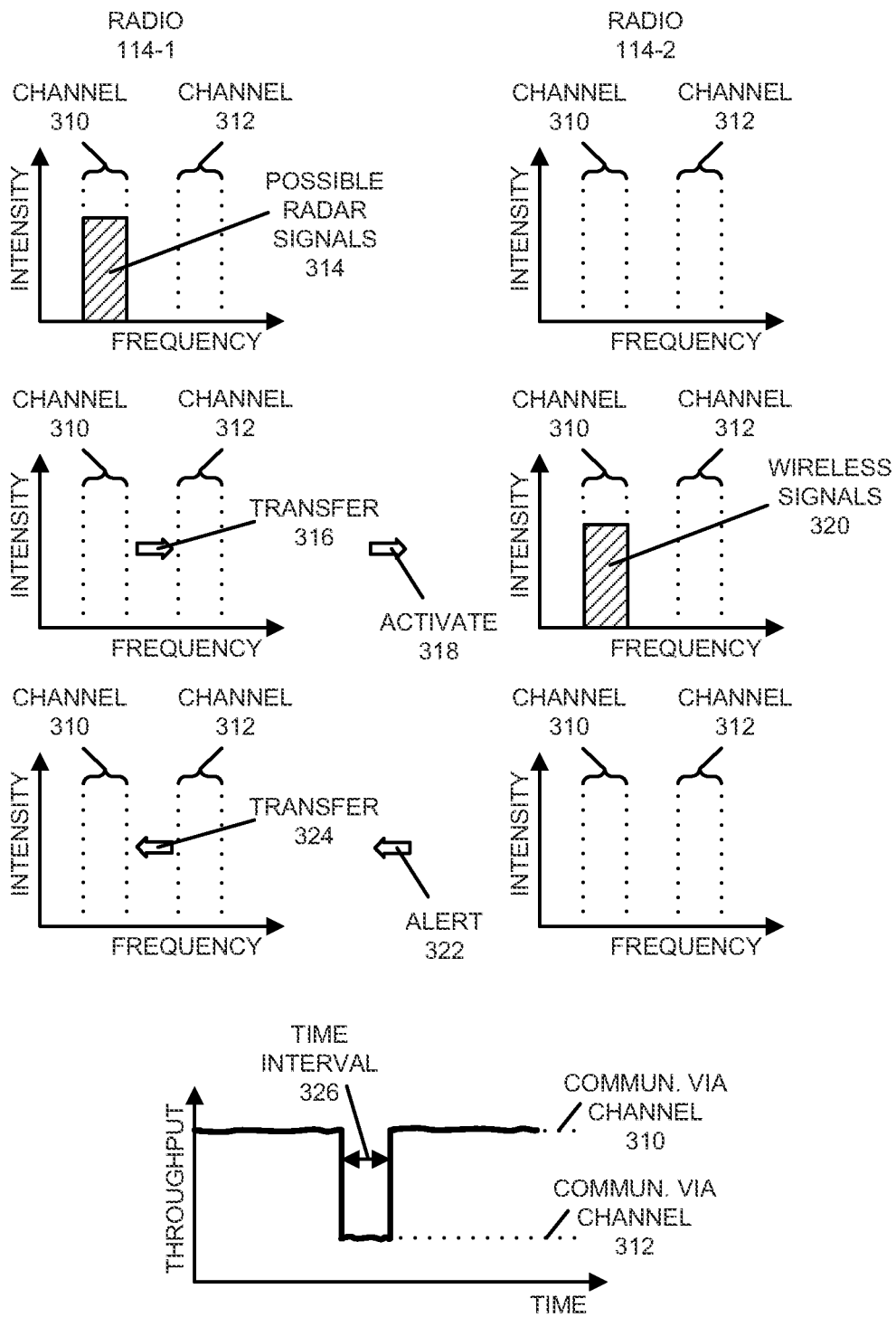
FIG. 3 is a drawing illustrating transferring communication between the first channel in the restricted band of frequencies and the second channel in the band of frequencies outside of the restricted band of frequencies in accordance with an embodiment of the present disclosure.

In an exemplary embodiment, as shown in FIG. 3, which presents a drawing illustrating the transferring of communication between channel 310 in the restricted band of frequencies and channel 312 in the band of frequencies outside of the restricted band of frequencies, radio 114-1 in the transmitting electronic device transmits packets to the receiving electronic device via channel 310 in a 5 GHz unlicensed band of frequencies subject to DFS when radio 114-1 detects possible radar signals 314. In response, radio 114-1 transfers 316 the communication of the packets to channel 312 in the 5 GHz unlicensed band of frequencies that is not subject to DFS and activates 318 radio 114-2. In response, radio 114-2 in the transmitting electronic device receives wireless signals 320 in channel 310, and analyzes wireless signals 320 by performing spectral analysis and comparing the frequency-domain information to a target signature (such as a bandwidth and spectral content) associated with the radar signals. (In general, the analysis and/or the comparison may be performed in the time domain and/or the frequency domain, and may involve techniques other than spectral analysis.) If the comparison indicates that wireless signals 320 are, in fact, not radar signals, radio 114-2 may alert 322 radio 114-1 (either directly or via a processor in the transmitting electronic device). Then, radio 114-1 may transfer 324 the communication of the packets back to channel 310. As shown in FIG. 3, this may restore the throughput, which degraded when the communication switched to channel 312. Note that the transition to and from channel 312 may occur in a short time interval 326, such as 10 ms.

In an exemplary embodiment, the transmitting electronic device continuously or periodically (such as after a time interval) scans different predefined or known radio frequencies and channels and stores the quality (such as one or more performance metrics) of the radio-frequency channels in a computer-readable storage medium (such as memory). This stored quality information allows the transmitting electronic device to use, at a given time, the highest quality channel available (such as the channel with the best value(s) of the one or more performance metrics). Because the radio-frequency channel quality changes as a function of time, the transmitting electronic device may need to constantly or periodically perform this channel-quality measurement scan.

In certain spectrums, the Federal Communication Commission requires very specific channel usage and availability scanning in order to prevent interference with military radar systems. Moreover, in different radio frequencies (such as the DFS spectrum or band of frequencies, television whitespace, other public frequency bands, etc.), the transmitting electronic device may monitor predefined or known DFS channels for potential radar interference for a defined period of time. The transmitting electronic device may consider DFS radar to be detected when an average minimum of −64 dBm transmit power occurs over 1 microsecond on a known DFS channel.

If interference is detected, the transmitting electronic device may proceed to another available channel (which may be in the 5 GHz DFS spectrum or in another band) and may repeat the channel-availability check. If the channel is available, the transmitting electronic device may add the channel to the list of known available channels for use by the transmitting electronic device. Once the transmitting electronic device has determined that there is at least one other available channel, the transmitting electronic device may begin using one or more of the available channels to communicate information.

While the transmitting electronic device uses one or more of the available channels, the transmitting electronic device may (continuously or periodically) monitor the channels (including channels that are not currently being used) for interference from radar sources and other transmitting electronic devices. While monitoring the channels for interference, the transmitting electronic device may also continuously or periodically scan for any newly available channels that can be used (which may include repeating one or more of the preceding operations).

If there is interference from radar sources or other transmitting devices on a particular channel, the transmitting electronic device may mark the channel as unavailable and may immediately (or after a short time interval) move or handover to other available determined channels. If no available channels exist within the DFS spectrum, the television whitespace and/or other public frequencies, the transmitting electronic device may use the IEEE 802.11 publically available (non-DFS) channels in the 2.4 GHz and 5 GHz spectrums.

Figure 4:
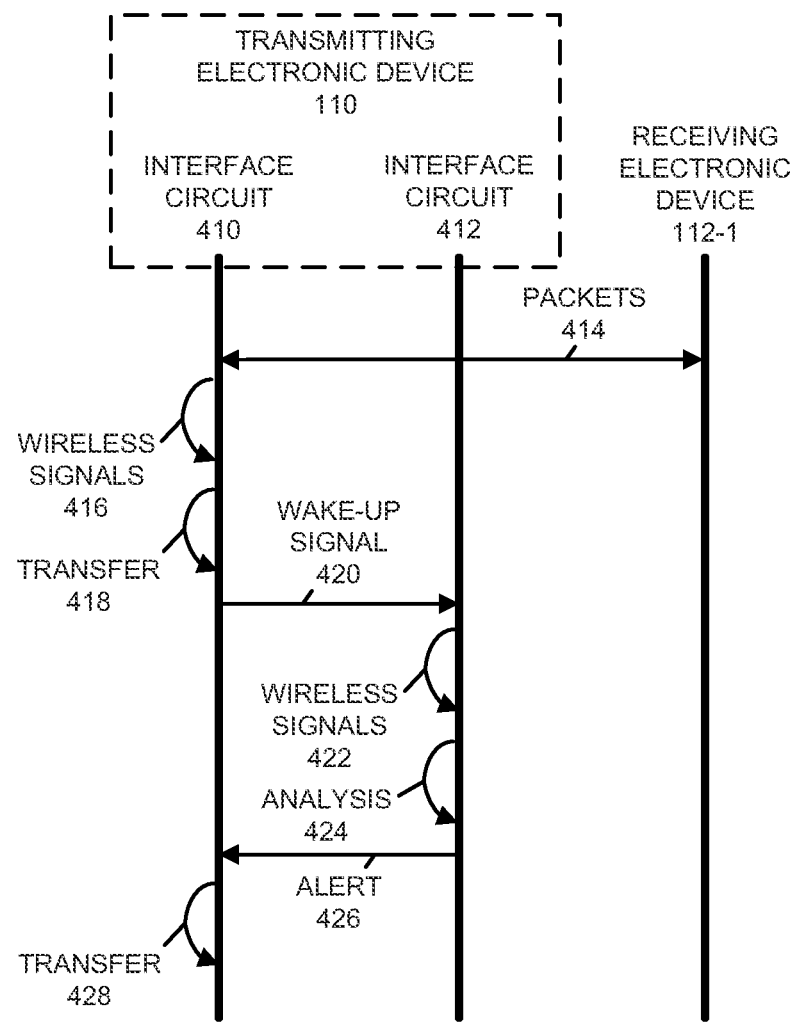
FIG. 4 is a drawing illustrating communication among the electronic devices in FIG. 1 in accordance with an embodiment of the present disclosure.

Embodiments of the communication technique are further illustrated in FIG. 4, which presents a drawing illustrating communication between transmitting electronic device 110 and receiving electronic device 112-1 (FIG. 1). In particular, interface circuit 410 communicates packets 414 with receiving electronic device 112-1 via the first channel. When interface circuit 410 detects wireless signals 416 in the first channel that are other than those associated with the communication, interface circuit 410 transfers 418 the communication with receiving electronic device 112-1 to the second channel.

Next, interface circuit 410 may send a wake-up signal 420 to interface circuit 412. In response, interface circuit 412 receives wireless signals 422 in the first channel. Then, interface circuit 412 analyzes 424 wireless signals 422. When analysis 424 of wireless signals 422 indicates wireless signals 422 have a signature other than a target signature, interface circuit 412 alerts 426 interface circuit 410, and interface circuit 410 transfers 428 the communication with receiving electronic device 112-1 back to the first channel.

We now describe embodiments of the electronic device. FIG. 5 presents a block diagram illustrating an electronic device 500, such as transmitting electronic device 110 or one of receiving electronic devices 112 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, interface circuits 518 and associated antennas 520. (While FIG. 5 includes antennas 520, in some embodiments electronic device 500 includes one or more nodes, such as nodes 508, e.g., pads, which can be coupled to antennas 520. Thus, electronic device 500 may or may not include antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 518 and at least one of antennas 520 may constitute a radio.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display (such as the communication warning message), which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Moreover, while one of antennas 520 is shown coupled to a given one of interface circuits 518, there may be multiple antennas coupled to the given one of interface circuits 518. Additionally, one or more of the subsystems may not be present in electronic device 500. Furthermore, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as one or more radios. Moreover, the integrated circuit may include hardware and/or software mechanisms that are used for transmitting wireless signals from electronic device 500 and receiving signals at electronic device 500 from other electronic devices. Note that an instance of a radio in electronic device 500 may be capable of transmitting and/or receiving information with another electronic device. Aside from the mechanisms herein described, radios are generally known in the art and hence are not described in detail. In general, networking subsystem 514 and/or the integrated circuit can include any number of radios.

In some embodiments, networking subsystem 514 and/or the integrated circuit include a configuration mechanism (such as one or more hardware and/or software mechanisms) that configures the radios to transmit and/or receive on a given channel (e.g., at a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as drivers for interface circuits 518) and/or in firmware in interface circuits 518. Alternatively or additionally, at least some of the operations in the communication technique may be implemented in a physical layer, such as hardware in interface circuits 518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A transmitting electronic device, comprising:
a first pad configured to couple to a first antenna;
a second pad configured to couple to a second antenna;
a first interface circuit, communicatively coupled to the first pad, which is configured to receive, from the first pad, first signals corresponding to first wireless signals that are associated with a first channel in a restricted band of frequencies, and is configured to analyze the first signals based on a target signature; and
a second interface circuit, communicatively coupled to the second pad and the first interface circuit, which is configured to:

communicate, to or from the second pad, packets associated with the receiving electronic device and the first channel;

when the second interface circuit detects second signals corresponding to second wireless signals, which are other than those associated with the communication and are associated with the first channel, transfer the communication with the receiving electronic device to a second channel in a band of frequencies outside of the restricted band of frequencies; and when the analysis by the first interface circuit indicates the first signals have a signature other than the target signature, transfer the communication with the receiving electronic device back to the first channel, wherein the analysis is performed, at least in part, after the transferring of the communication with the receiving electronic device to the second channel; and wherein the transfer back to the first channel is within a first time interval that is less than a second time interval that the first channel is avoided when the signature of the first signals matches the target signature.

2. The transmitting electronic device of claim 1, wherein the restricted band of frequencies include an Unlicensed-National Information Infrastructure (U-NII) band of frequencies subject to Dynamic Frequency Selection (DFS).

3. The transmitting electronic device of claim 1, wherein the band of frequencies outside of the restricted band of frequencies includes a U-NII band of frequencies without DFS.

4. The transmitting electronic device of claim 1, wherein the target signature corresponds to radar signals.

5. The transmitting electronic device of claim 1, wherein the analysis includes spectral analysis.

6. The transmitting electronic device of claim 1, wherein the communication of the packets is compatible with an IEEE 802.11 standard.

7. The transmitting electronic device of claim 1, wherein the second interface circuit is configured to activate the first interface circuit after transferring the communication to the second channel.

8. The transmitting electronic device of claim 1, wherein transferring the communication back to the first channel maintains a performance metric associated with the communication.

9. The transmitting electronic device of claim 8, wherein the performance metric includes throughput.

10. A non-transitory computer-readable storage medium for use in conjunction with a transmitting electronic device, the computer-readable storage medium storing a program module that, when executed by the transmitting electronic device, causes the transmitting electronic device to transfer communication between a first channel in a restricted band of frequencies and a second channel in a band of frequencies outside of the restricted band of frequencies by performing one or more operations comprising:

communicating, via a second interface circuit in the transmitting electronic device, packets associated with a receiving electronic device and the first channel;

when the second interface circuit detects second signals corresponding to second wireless signals associated with the first channel that are other than those associated with the communication, transferring the communication with the receiving electronic device to the second channel; and when analysis of first signals corresponding to first wireless signals that are associated with the first channel, and that are received from a first interface circuit in the transmitting electronic device, indicates the first signals have a signature other than a target signature, transferring the communication with the receiving electronic device back to the first channel, wherein the analysis is performed, at least in part, after transferring the communication with the receiving electronic device to the second channel; and wherein the transfer back to the first channel is within a first time interval that is less than a second time interval that the first channel is avoided when the signature of the first signals matches the target signature.

11. The computer-readable storage medium of claim 10, wherein the restricted band of frequencies include an Unlicensed-National Information Infrastructure (U-NII) band of frequencies subject to Dynamic Frequency Selection (DFS).

12. The computer-readable storage medium of claim 10, wherein the band of frequencies outside of the restricted band of frequencies includes a U-NII band of frequencies without DFS.

13. The computer-readable storage medium of claim 10, wherein the target signature corresponds to radar signals.

14. The computer-readable storage medium of claim 10, wherein the communication of the packets is compatible with an IEEE 802.11 standard.

15. The computer-readable storage medium of claim 10, wherein transferring the communication back to the first channel maintains a throughput associated with the communication.

16. A method for transferring communication between a first channel in a restricted band of frequencies and a second channel in a band of frequencies outside of the restricted band of frequencies, wherein the method comprises:

by a transmitting electronic device:

communicating, via a second interface circuit in the transmitting electronic device, packets associated with a receiving electronic device and the first channel;

when the second interface circuit detects second signals corresponding to second wireless signals associated with the first channel that are other than those associated with the communication, transferring the communication with the receiving electronic device to the second channel; and when analysis of first signals corresponding to first wireless signals that are associated with the first channel received, and that are received from a first interface circuit in the transmitting electronic device, indicates the first signals have a signature other than a target signature, transferring the communication with the receiving electronic device back to the first channel, wherein the analysis is performed, at least in part, after the transferring of the communication with the receiving electronic device to the second channel; and wherein the transfer back to the first channel is within a first time interval that is less than a second time interval that the first channel is avoided when the signature of the first signals matches the target signature.

17. A transmitting electronic device, comprising:

an input/output (I/O) interface configured to communicate with a wireless receiver that receives first signals corresponding to first wireless signals that are associated with a first channel in a restricted band of frequencies, and configured to analyze the first signals based on a target signature a pad configured to couple to an antenna; and an interface circuit, communicatively coupled to the pad and the I/O interface, which-is configured to:

communicate, to or from the pad, packets associated with the receiving electronic device and the first channel;

when the interface circuit detects second signals corresponding to second wireless signals, which are other than those associated with the communication, and are associated with the first channel, transfer the communication with the receiving electronic device to a second channel in a band of frequencies outside of the restricted band of frequencies; and when the analysis by received from the wireless receiver indicates the first signals have a signature other than the target signature, transfer the communication with the receiving electronic device back to the first channel, wherein the analysis is received, at least in part, after the transferring of the communication with the receiving electronic device to the second channel; and wherein the transfer back to the first channel is within a first time interval that is less than a second time interval that the first channel is avoided when the signature of the first signals matches the target signature.

18. A transmitting electronic device, comprising:

a pad configured to couple to an antenna; and an interface circuit, communicatively coupled to the pad, which is configured to:

communicate, to or from the pad, packets associated with the receiving electronic device and a first channel in a restricted band of frequencies;

when the interface circuit detects second signals corresponding to second wireless signals, which are other than those associated with the communication, and are associated with the first channel, transfer the communication with the receiving electronic device to a second channel in a band of frequencies outside of the restricted band of frequencies;

receive, from the pad, analysis of first signals corresponding to first wireless signals that are associated with the first channel, wherein the analysis is associated with a transceiver that is separate from the transmitting electronic device,. wherein the analysis is received after the transferring of the communication with the receiving electronic device to the second channel; and when the analysis indicates the first signals have a signature other than the target signature, transfer the communication with the receiving electronic device back to the first channel; and wherein the transfer back to the first channel is within a first time interval that is less than a second time interval that the first channel is avoided when the signature of the first signals matches the target signature.

19. The method of claim 16, wherein the restricted band of frequencies include an Unlicensed-National Information Infrastructure (U-NII) band of frequencies subject to Dynamic Frequency Selection (DES); and wherein the band of frequencies outside of the restricted band of frequencies includes a U-NII band of frequencies without DFS.

20. The transmitting electronic device of claim 17, wherein the restricted band of frequencies include an Unlicensed-National Information Infrastructure (U-NII) band of frequencies subject to Dynamic Frequency Selection (DFS); and wherein the band of frequencies outside of the restricted band of frequencies includes a U-NII band of frequencies without DFS.

21. The transmitting electronic device of claim 18, wherein the restricted band of frequencies include an Unlicensed-National Information Infrastructure (U-NII) band of frequencies subject to Dynamic Frequency Selection (DFS); and wherein the band of frequencies outside of the restricted band of frequencies includes a U-NII band of frequencies without DFS.

* * * * *